United States Patent
Day et al.

[15] 3,696,788
[45] Oct. 10, 1972

[54] METHOD AND APPARATUS FOR HATCHING CRUSTACEA

[72] Inventors: John J. Day; Paul S. Hirschman, both of Fort Lauderdale, Fla.

[73] Assignee: Ocean Protein Corporation, New York, N.Y.

[22] Filed: Dec. 8, 1970

[21] Appl. No.: 96,138

Related U.S. Application Data

[63] Continuation-in-part of Ser. No. 887,814, Dec. 24, 1969.

[52] U.S. Cl. ............................................. 119/2, 119/5
[51] Int. Cl. .............................................. A01k 61/00
[58] Field of Search ..................................... 119/2, 5

[56] References Cited

UNITED STATES PATENTS

| | | |
|---|---|---|
| 2,984,207 | 5/1961 | Drake ........................... 119/2 |
| 3,062,183 | 11/1962 | Tate ............................. 119/15 |
| 3,540,414 | 11/1970 | Maloney, Jr. ................... 119/2 |

*Primary Examiner*—Aldrich F. Medbery
*Attorney*—Darby & Darby

[57] ABSTRACT

A tank apparatus and method for providing advantageous environment for the hatching and early development of crustacean larvae. A plurality of hatching chambers, each having an adjacent larval chamber, with a low bulkhead separating the larval chamber from the hatching chamber. Light sources near the larval chambers cause the larvae to migrate to the latter chambers when the water level is above the bulkhead and the screening is removed. A removable screen mesh can be mounted atop the bulkhead to contain the larvae in the larval chamber. A spray arrangement is also provided to wash down the walls forming the larval chamber portion of the hatching tank to prevent larvae from jumping out and air is supplied to the hatching tank.

15 Claims, 4 Drawing Figures

PATENTED OCT 10 1972

INVENTORS
JOHN J. DAY
PAUL S. HIRSCHMAN
BY
Darby & Darby
ATTORNEYS

INVENTORS
JOHN J. DAY
PAUL S. HIRSCHMAN
BY
Darby & Darby
ATTORNEYS

METHOD AND APPARATUS FOR HATCHING CRUSTACEA

RELATED APPLICATION

This application is a continuation-in-part of our copending application Ser. No. 887,814, filed Dec. 24, 1969, entitled HATCHING TANK FOR CRUSTACEA, which is assigned to the same assignee.

BACKGROUND OF THE INVENTION

1. Field of the Invention

This invention relates to an apparatus and method for providing an optimum environment for the hatching and early development of crustacean larvae.

2. Description of the Prior Art

The prior art relevant to the husbandry of crustaceans is generally primitive. A widely used practice is to simply place large numbers of crustacea of similar age into a contained pond and allow them to grow, harvesting some crustaceans from time to time.

One of the problems with this practice is that crustaceans, especially shrimp, tend to be quite cannibalistic. This cannibalistic tendency becomes evident at an early age. Shrimp larvae which hatch in the presence of other larvae only a few days older are in danger of being eaten by their elders, since the early development is quite rapid, and a few days' additional age will enable a shrimp larvae to grow large enough to eat newly hatched larvae.

Larvae often require water conditions different from those suitable for adult crustaceans. It has been found that in order to obtain optimum growth and survival rates of young shrimp or other crustaceans, it is highly useful to exert precise control over water conditions. A single hatching of shrimp can yield from 50,000 to 100,000 larvae. These immense numbers of larvae can cause the water to be contaminated with waste products and food. This contamination is deleterious to the development of the larvae. Also, precise temperature control over the water is desirable. Furthermore, for certain species such as certain *Macrobrachium carcinus* species, it has been found desirable to hatch the young shrimp in fresh water, and within a short time alter their surroundings to obtain a desired salinity. Experiments with the species *Macrobrachium carcinus* indicates that optimum salinity is between 12 and 20 parts per thousand of salt in water.

As is obvious, it would be extremely difficult to exert this type of water control over an entire large pond, in order to promote the most rapid and successful development of larvae. Furthermore, even if this could be done, it would probably not be desirable to the entire shrimp community present in the pond to alter significantly the salinity of the water.

In the raising of certain types of crustaceans under controlled conditions in tanks, it also has been found that at a certain point in their development as larvae and prior to metamorphosis the larvae begin jumping. In some cases, the larvae can jump out of the tank and be killed.

OBJECTS OF THE INVENTION

It is an object of this invention to provide an apparatus and method whereby newly hatched crustacea are protected from the cannibalistic tendency of their species.

Another object of this invention is to enable frequent treatment of the water environment of the larvae without disturbing or damaging them.

A further object of the invention is to provide a hatching tank for crustacea.

Still another object is to provide a tank for growing of crustacean larvae in which an arrangement is provided for preventing the larvae from jumping out of the tank.

SUMMARY OF THE INVENTION

This invention is an apparatus and method for providing an optimum environment for the hatching and development of shrimp or other crustacean larvae. The apparatus comprises a tank containing a number of hatching chambers separated from one another by solid walls. Each hatching chamber has adjacent to it a larval chamber, the two chambers being separated by a bulkhead. Removable screen mesh dividers are provided to be inserted at will atop the bulkheads. Light sources are positioned near each of the larval chambers.

The shrimp are hatched in the hatching chambers, and the light sources turned on. This causes the shrimp larvae to migrate over the bulkhead if the water level is sufficiently high. Once inside the larval chambers, the screens are positioned to prevent re-entry into the hatching chambers. With the larvae thus contained, operations can be performed upon the water in both chambers without danger of injuring the larvae. This is done by operating in the vacated hatching chamber.

To prevent the larvae from jumping out of the tank during their growth period, an arrangement is provided for washing down the side walls of the tank with water. This is done during the period of the growth cycle when the larvae have a tendency to jump out of the tank.

DESCRIPTION OF DRAWINGS

FIG. 1 is a perspective view of the hatching tank of this invention, showing hatching and larval chambers, bulkheads, screen mesh, light sources and standpipes.

FIG. 2 is a side view of the hatching tank of this invention, taken partially in cross section, showing the standpipe, drainpipe and valve arrangements for controlling the water environment within the tank.

DESCRIPTION OF THE INVENTION

Figure 3:
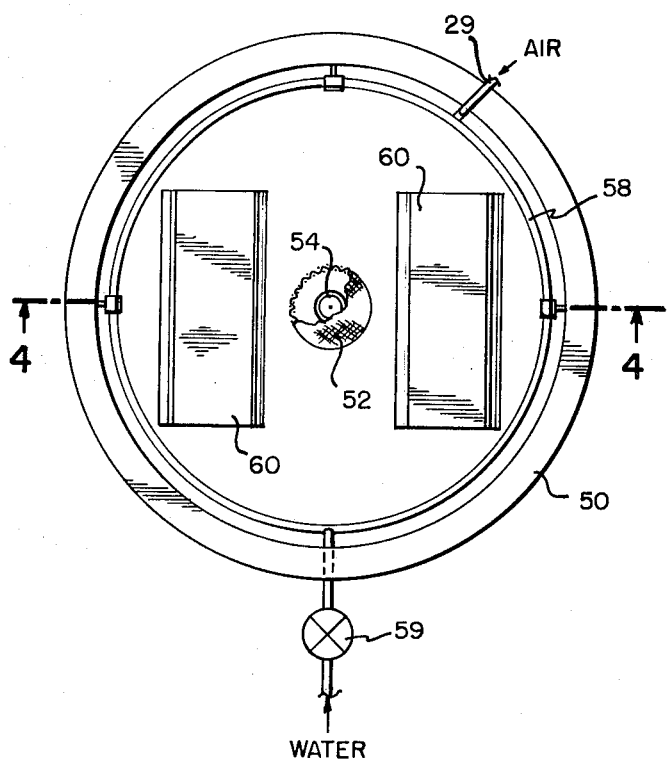
FIG. 3 is a plan view of another hatching tank in accordance with the invention in which the larvae are reared.
Figure 4:
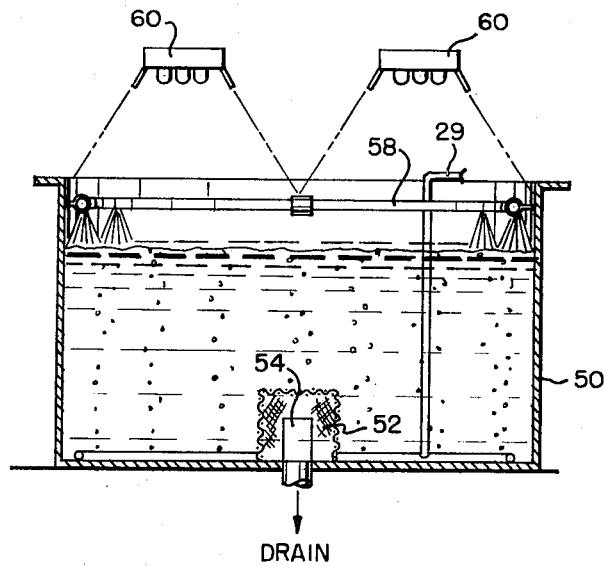
FIG. 4 is an elevational view, in cross-section, of the tank of FIG. 3.

The basic component of the hatching tank is tank body 10. Tank 10 can be, for example, approximately 20 feet long, 8 feet wide and 3 feet in depth. Within tank body 10 are located a number of adjacent hatching chambers 12, each separated from the others by solid wall 14. Adjacent each hatching chamber 12 is a larval chamber 13. Each larval chamber is separated from its adjacent hatching chamber by a low bulkhead 15. Bulkhead 15 is about 2 feet high in the exemplary tank being described. Bulkhead 15 may be removable if desired but may be permanently joined to the bottom of the tank body 10.

Removable screen mesh dividers 18 are provided, one to each bulkhead, and are capable of being removably mounted vertically atop each of bulkheads 15. The larval chambers are separated from one another by solid wall 16.

Standpipes 20, drainpipes 22 and valve 21 control overflow of water from the tanks. A hose 23 and pump 24 are also provided in order to enable insertion or removal of water from the tanks. To maintain the proper water temperature in the larval tanks, heaters can be immersed directly into the tanks or the water supplied to the tanks pre-heated. Air is also supplied to each of the larval tanks through a pipe 29 which lies on the floor of each tank. This assures the larvae of an adequate supply of oxygen.

In order to utilize this invention, a female crustacean such as a shrimp of the species *Macrobrachium carcinus*, bearing fertilized eggs, is placed in each hatching chamber 12. The water level of hatching chamber 12 is below the level of bulkhead 15 so that initially there is no circulation of water between a larval chamber 13 and its associated hatching chamber 12. The water in a hatching chamber 12 contains little or no salt, while the water in a larval chamber can be kept at any desired salinity.

Removable covers 25 are provided to cover hatching chambers 12. The reason for this is that it is desirable for the female to remain quite calm and quiescent during the hatching process. Darkness encourages calm.

Sufficient salt is placed in each larval chamber 13 such that when the water level in its associated hatching tank 12 is raised to its maximum desirable level after hatching and thus spills over bulkhead 15, the entire volume of water in the unit comprising a hatching chamber 12 and a larval chamber 13 will contain salt in a desired ratio. This can be, for example, approximately 12 and 20 parts per thousand by weight of salt to water.

During the hatching process, however, the water level is kept below the level of bulkhead 15 in a hatching chamber 12. When the shrimp larvae begin to hatch, they can be seen with the naked eye when hatching tank 12 is carefully examined. The hatching process itself takes only a few hours, and from 50,000 to 100,000 larvae per hatch are obtained.

The female is preferably allowed to remain in her hatching chamber for from 24 to 48 hours after larvae are first observed. This assures the completion of hatching. The female is then removed from the hatching chamber and returned either to a mating tank or to her normal environment. This leaves the larvae swimming alone in the hatching chamber in a medium of fresh water.

At this point, pump 24 and hose 23 are utilized to fill the hatching chamber 12 in which the larvae were just hatched to a level such that the water spills over bulkhead 15 into the adjacent larval chamber 13. The water is allowed to continue to rise until the maximum desirable water level is reached with both the hatching chamber and its associated larval chamber filled, and the water level several inches above the top of bulkhead 15. The entry of water from hatching chamber 12 into larval chamber 13 causes the salt water placed in chamber 13 to mix and disperse throughout both chambers. Thus, the desired degree of salinity is achieved with respect to all the water in both the hatching and larval chambers, automatically, by simply raising the water level.

Thus far nothing obstructs the larvae from swimming into the adjacent larval chamber from the hatching chamber. At this point, a cover 25 is placed over the hatching chamber 12 in which the hatch took place to darken it. Light sources 19, adjacent the larval chambers 13, are turned on. This results in the larval chambers being brightly illuminated with respect to the hatching chambers. It is known that the larvae will migrate toward a source of light, and they therefore swim from a chamber 12 over bulkhead 15 into larval chamber 13.

After some time, when the larval migration is complete, the screen mesh divider 18 is installed atop bulkhead 15. Screens 18 are of a gauge fine enough to prevent the larvae from returning to hatching tank 12.

It can be seen that, as soon as the larvae are completely hatched, the female's removal assumes that she will not pollute the environment and also negates the possibility that she may devour her young.

Only one female can use the hatching tank at a given time, in which case one chamber 12 would be empty and its adjacent larval tank not used. As should be apparent, two females can hatch larvae at the same time, one in each chamber 12. The larvae will then migrate to their respective adjacent larval chamber 13. It is noted that walls 14 and 16 are solid and do not permit the passage of larvae from one hatching chamber to another, nor from one larval chamber to another. The reason for this is that larvae which are more than a few days old have both the capability and the inclination to devour newborn shrimp larvae. This is an early manifestation of the crustacean's cannibalistic tendency. Therefore, because female egg-bearing shrimp in adjacent hatching chambers may hatch their young at different times, the young crustaceans must be kept in separate areas.

As has been noted above, it is critical in the early development of shrimp larvae that, in order to get optimum growth and survival, water conditions be closely controlled. The enormous numbers of shrimp larvae generate substantial quantities of waste material which must be removed at frequent intervals from the water. Water temperature must be maintained within close limits. Waste food must be removed from the water. The water may be changed frequently both to clean it and in order that there always be plenty of oxygen available to the growing larvae. To accomplish this, a suitable drain and filter system can be provided (not shown).

If the larvae were allowed to swim about at will through both the hatching and larval chambers, it would be extremely difficult to operate upon, remove water from, or add water to the hatching tank without injuring or pumping out larvae. By means of this invention, however, the larvae are maintained in the volume of the larval chambers, leaving the hatching chamber empty of larvae. Therefore, pumps and hoses and strainers and the like can be used to treat, remove from, or add water to that which is present in the tank, without fear of either injuring larvae or unwittingly pumping them away.

It is also noteworthy that screens 18, while being too fine to allow larvae to pass, do allow the circulation of water from hatching chamber to larval chamber and back. This means that contamination of the water occurs at a slower rate than it would if the only water available to the larval chamber were that confined within the walls of that chamber itself. Thus, this invention enables the maintenance of greater stability in water conditions than if the larvae were simply confined in the larval chamber, with no water circulation at all.

It also has been found that larvae of various types of crustaceans exhibit a tendency to jump out of the water. The biological reason for the jumping is not understood. The jumping commences at a time prior to metamorphosis and continues for some time after metamorphosis. In the case of the species Macrobrachium Rosenbergi, jumping commences usually within 15–20 days after the larvae have hatched and lasts for about a week. The larvae jump from the water surface to the wall of the tank. If the water level is close enough to the top of the hatching tank and/or the larvae jump high enough, they clear the wall of the tank and fall on the floor. These larvae are usually killed, thereby resulting in a greatly increased mortality rate for a given hatch. It has been found that the larvae can be kept in the tank by washing down the tank walls with water. By doing this, the mortality rate of any given hatch can be kept lower.

FIGS. 1 and 2 show a spray pipe 40 which is located adjacent the four walls of each of the larval chambers 13. The spray pipe is connected through a valve 42 to a source of water (not shown). The spray pipe, which can be of PVC plastic, has a number of holes along its length which are made so that the water from the pipe will flow onto the corresponding adjacent wall of the tank. It is preferred that the spray pipe be located to form a water spray over substantially the entire wall surface area. This prevents substantially all of the larvae from jumping out of the tank. It is only necessary to supply water to the spray pipe 40 from a time just prior to when they start to jump until a time after the jumping stops or until they are transferred to a growing tank.

FIG. 3 shows another form of larvae hatching tank according to the invention. Here, a round tank 50 is provided which can be of any suitable material such as metal, plastic or FIBERGLASS. It has been found that a round tank has certain advantages for hatching purposes since it can be made to provide a flowing action for the water which the larvae seem to prefer.

A screen 52, which is closed on all sides and on the top, is located in the center of tank 50 over a drain fitting 54. The drain fitting leads to a filter system (not shown) so that the water in the tank can be constantly recirculated and cleaned. The mesh size of the screen 52 is such to prevent larvae from being sucked into the drain 54. Lights 58 are suspended above the surface of the water in the tank. As in the case of FIG. 1, the lights aid in causing the hatched larvae to migrate to various parts of the tank. The tank also has the air supply pipe 29.

A spray pipe 58 is located around the upper rim of the tank. Pipe 58 is connected to a source of fresh or filtered water through a valve 59. The pipe is perforated to provide a water spray to wash down the walls of the tank to prevent the larvae from jumping out of the tank, as explained with respect to FIGS. 1 and 2.

Larvae can be hatched in tank 50 in one of several ways. If desired, a gravid female can be placed directly into the water of the tank and permitted to hatch. The water temperature and salinity are adjusted and controlled as needed.

The female also can be placed in a container, such as a bucket, which is partially filled with water. The container can be considered as forming the hatching chamber. The female can be permitted to hatch the larvae in the container either before or after it is placed in the water of the tank. In the former case, when the container with female and larvae are placed in the water of tank 50, the water circulation will cause the larvae to be distributed throughout the tank. Migration of the larvae is aided by the lights 58. The female also can be permitted to hatch while the container is in the tank. In this case, the larvae also will migrate throughout the tank due to water circulation and the light stimulus. The top of the container can be covered, if desired, with a large mesh screen to prevent the female from leaving while still permitting the larvae to migrate from the container after being hatched. After the hatch has been completed, the container, with the female, is removed from the tank.

It should be evident herefrom that this invention is of substantial benefit in the husbandry of very young crustacean life.

What is claimed is:

1. A hatching tank for crustacea larvae comprising, means for draining water from said tank, means for preventing said larvae from being drained from the tank by said drain means, and means for supplying fluid to the tank wall above the normal level of water in the tank to prevent the larvae from jumping out of the tank.

2. A hatching tank as in claim 1, further comprising means for inducing the larvae to migrate to various portions of the tank.

3. The hatching tank as in claim 1 further comprising means for isolating a female, egg bearing crustacean within a predetermined portion of the overall confines of said tank.

4. The hatching tank of claim 3 wherein said means for isolating the female crustacean comprises a container which can be immersed into the fluid of said container while holding the female crustacean therein, said container having at least one opening to permit the larvae to migrate therefrom into the fluid of the tank.

5. A hatching tank as in claim 4 further comprising means for inducing the hatched larvae to migrate from the container to various portions of the tank.

6. A hatching tank as in claim 1 wherein said tank is generally circular, said fluid supply means comprising a ring located adjacent the top of the tank and of the same general shape as the tank for supplying the fluid to various parts of the tank preventing the larvae from jumping out of the tank.

7. The method of providing a suitable environment for the hatching and early development of crustacean larvae comprising the steps of:
hatching the crustacea larvae in a tank of water, and
discharging fluid onto the interior wall of the tank to prevent the crustacea larvae from jumping out of the tank.

8. The method of claim 7 wherein said crustacea are hatched by placing a female crustacean in the fluid within the confines of the tank.

9. The method of claim 7 wherein the step of placing the female crustacean in the tank comprises the step of placing the female in a container having at least one opening therein through which the larvae migrate to other portions of the tank.

10. The method of claim 7 wherein the step of placing the female crustacean in the tank comprises:
   a. physically isolating a female crustacean bearing fertilized eggs in a hatching chamber containing water, said hatching chamber being in fluid communication with a larval chamber and
   b. inducing newly hatched larvae to migrate from said hatching chamber to said larval chamber.

11. The method of claim 9 further comprising the step of inducing the larvae to migrate from the container to other portions of said tank.

12. The method of claim 11 wherein said inducing step comprises illuminating said other portions of said tank.

13. The method of claim 10 wherein said inducing step comprises illuminating said larval chamber relative to said hatching chamber.

14. A tank for containing fluid to provide suitable environment for the hatching and early development of crustacea larvae, comprising:
   a. means forming a hatching chamber,
   b. means forming a larval chamber adjacent thereto,
   c. means forming a passage way between the hatching and larval chambers,
   d. inducing means to induce said larvae to migrate from said hatching chamber to said larval chamber, and
   e. fluid discharge means for supplying fluid to wash down the interior of the walls of the larval chamber above the level of the fluid contained in said larval.

15. The tank of claim 14 wherein said fluid supply means comprises means for surrounding a major portion of the tank wall defining the larval chamber for supplying a plurality of streams of fluid to said wall.

* * * * *